United States Patent [19]

Gibson et al.

[11] 4,386,434
[45] May 31, 1983

[54] VERTICAL AND HORIZONTAL DETAIL SIGNAL PROCESSOR

[75] Inventors: Walter G. Gibson, Princeton; Roy M. Christensen, Titusville, both of N.J.

[73] Assignee: RCA Corporation, New York, N.Y.

[21] Appl. No.: 271,351

[22] Filed: Jun. 8, 1981

[51] Int. Cl.³ .............................................. H04N 5/14
[52] U.S. Cl. ...................................... 455/37; 455/38; 455/39
[58] Field of Search ....................... 358/37, 31, 38, 39, 358/40

[56] References Cited

U.S. PATENT DOCUMENTS

| | | | |
|---|---|---|---|
| 3,546,372 | 12/1970 | Dischert | 178/5.4 |
| 3,836,707 | 9/1974 | Murakami et al. | 178/5.4 R |
| 3,919,714 | 11/1975 | Bingham | 358/38 |
| 3,938,181 | 2/1976 | Avins | 358/37 |
| 4,050,084 | 9/1977 | Rossi | 358/31 |

OTHER PUBLICATIONS

S. V. Novakovsky, "Color Television Circuitry", SVJAZ Publishing House, Moscow, 1975, pp. 130-133.

Primary Examiner—Tommy P. Chin
Attorney, Agent, or Firm—E. M. Whitacre; J. S. Tripoli; R. G. Coalter

[57] ABSTRACT

A video signal is separated into a broad area luminance signal having attenuated vertical and horizontal detail components and a composite detail signal having horizontal and vertical detail components in a predetermined ratio. The broad area luminance signal is combined with the composite detail signal in desired proportions to provide continuous control of the picture detail from soft to sharp in all directions of reproduced images.

10 Claims, 10 Drawing Figures

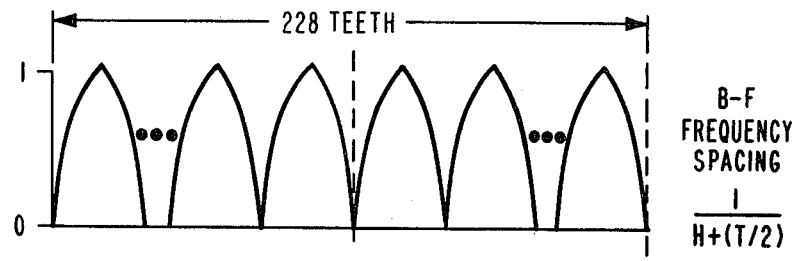
Fig. 2A — B-F FREQUENCY SPACING $\frac{1}{H+(T/2)}$
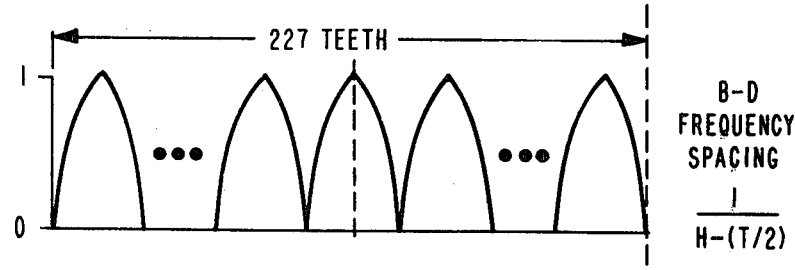
Fig. 2B — B-D FREQUENCY SPACING $\frac{1}{H-(T/2)}$
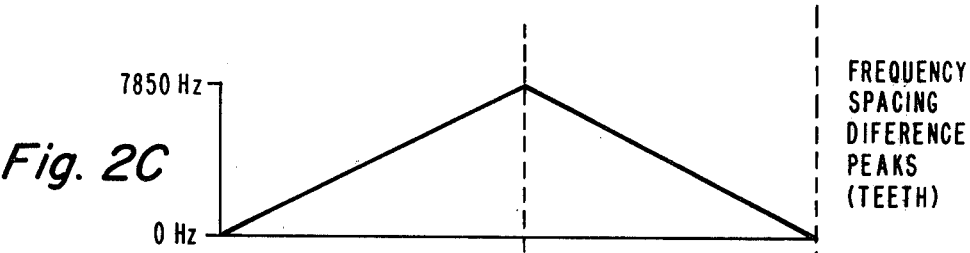
Fig. 2C — FREQUENCY SPACING DIFERENCE PEAKS (TEETH)
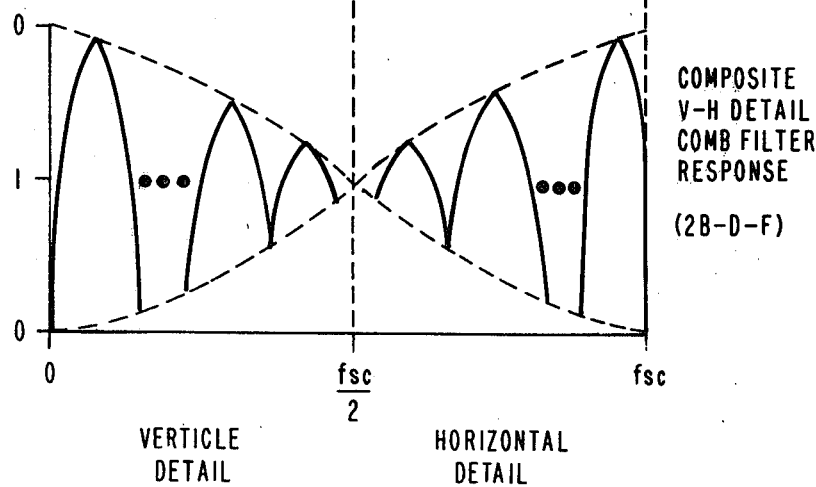
Fig. 2D — COMPOSITE V-H DETAIL COMB FILTER RESPONSE (2B-D-F)
VERTICLE DETAIL — HORIZONTAL DETAIL

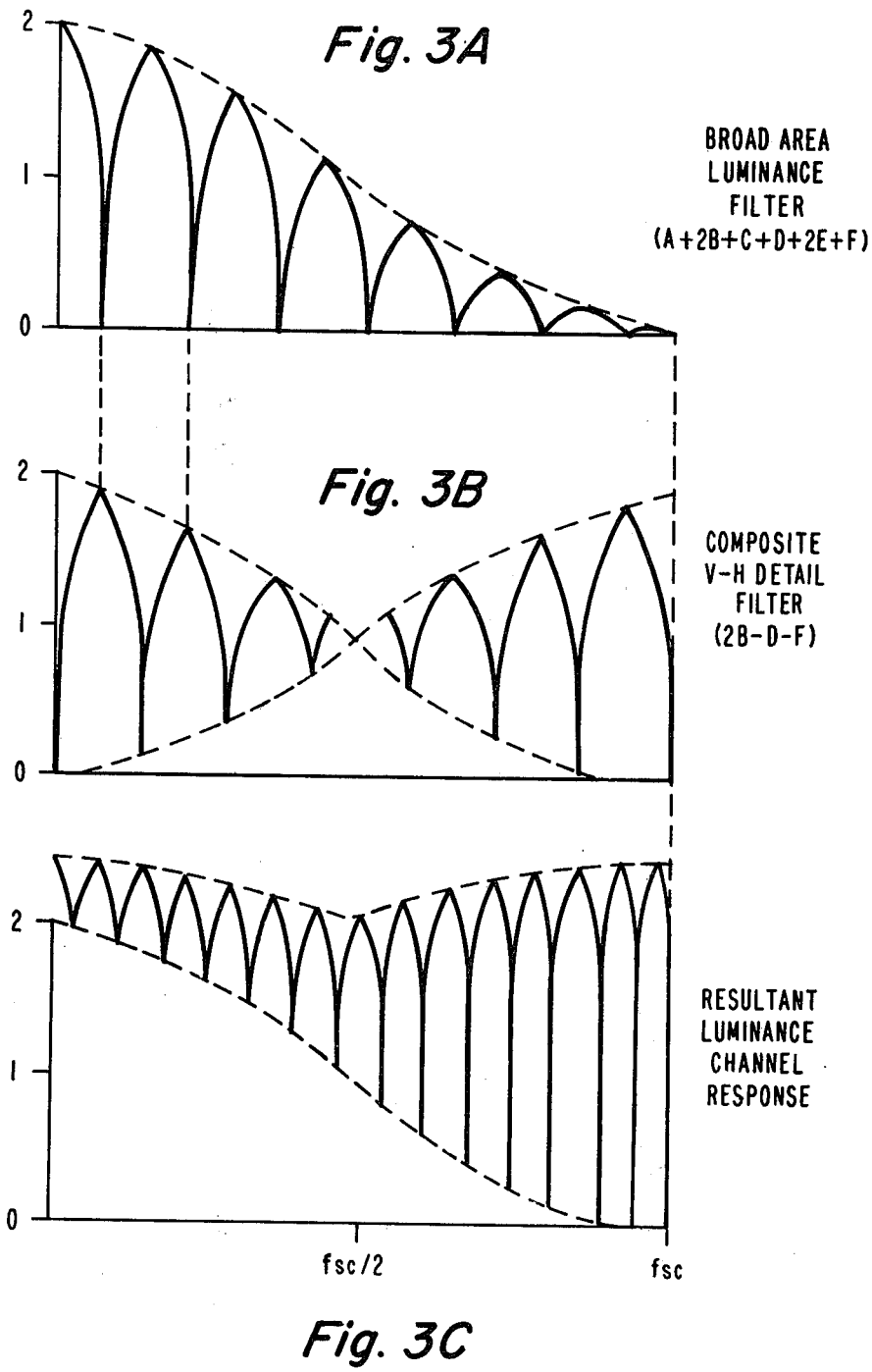

VERTICAL AND HORIZONTAL DETAIL SIGNAL PROCESSOR

This invention relates to television systems and particularly to apparatus for controllably enhancing (peaking) or attenuating (softening) the vertical and horizontal detail components of a television signal to provide improved control of the definition of reproduced images.

The finite size of the spots of the scanning beams employed in camera tubes and in television image reproducing tubes and lens aberrations in the optical systems commonly utilized in conjunction with the camera tubes cause aperture distortion of the image. This aperture distortion manifests itself as a loss of resolution when, for example, the scanning spots are large enough to cover more than one picture element at the same time. Aperture distortion (and the resultant loss of picture "detail" or "sharpness") is common to both monochrome and color television systems. Various methods have been employed to reduce the aperture distortion and restore or enhance the detail of the edges of the video signal representative of the image to be reproduced.

Examples of detail enhancement processors are given by S. V. Novakovsky in "Color Television Circuitry", "SVJAZ", Publishing House, Moscow, 1975, pp. 130-133, 364. Novakovsky describes processors in which vertical and horizontal correction signals are generated and added to the original video signal via a common signal path to provide detail compensation or enhancement in all directions (vertical, diagonal, and horizontal). An advantage of the common signal path for the compensating signals is that a single control element (e.g., a potentiometer, a variable gain amplifier or other signal level controlling device) in the compensating signal path may be used to simultaneously control vertical, diagonal, and horizontal peaking levels. Dischert, in U.S. Pat. No. 3,546,372, also describes a vertical and horizontal aperture equalization circuit which provides a detail enhanced signal having both vertical and horizontal peaking components.

In the aforementioned systems, the vertical detail component of the compensating signal is produced by a transversal filter which includes two 1H delay elements. It is one object of the present invention to substantially reduce the amount of time delay required in the detail enhancement processor while retaining the "one knob peaking" control feature.

A further aspect of the known compensating systems is that the compensating signal is added to an essentially broadband video signal which may itself contain vertical and horizontal peaking components. Where a "softer" reproduced image is desired, much unwanted components cannot be removed from the broadband video signal even if, for example, the compensating signal is fully attenuated by the peaking control. It is, therefore, a second object of the present invention to provide a detail signal processor having an increased range of control including detail suppression or attenuation as well as detail enhancement of the processed video signal so that the appearance of the reproduced image may be continuously adjusted by means of the peaking control from very "soft" (detail removed or attenuated) to very "sharp" (detail added or enhanced).

A video signal processor embodying the invention includes signal delay means having an input tap for receiving a video input signal to be delayed, a plurality of intermediate taps and an output tap. The taps are coupled to a first signal combining means to form a first comb filter means for providing a broad area luminance signal in which vertical and horizontal detail components thereof are attenuated. Selected ones of the taps are coupled to a second signal combining means to form a second comb filter means for providing a composite detail signal having a vertical detail component and a horizontal detail component in a predetermined ratio. The broad area luminance signal and composite detail signal are combined in a third signal combining means to provide a resultant video output signal. The third signal combining means includes control means for varying the ratio of the broad area luminance signal and the composite detail signal whereby the detail content of the video output signal may be attenuated for one setting of the control means and enhanced for another setting of the control means.

The invention is illustrated in the accompanying drawings wherein like elements are denoted by like reference designators and in which:

FIGS. 2A-2D and 3A-3C are waveform diagrams illustrating certain aspects of operation of the processor of FIG. 1.

Figure 1:
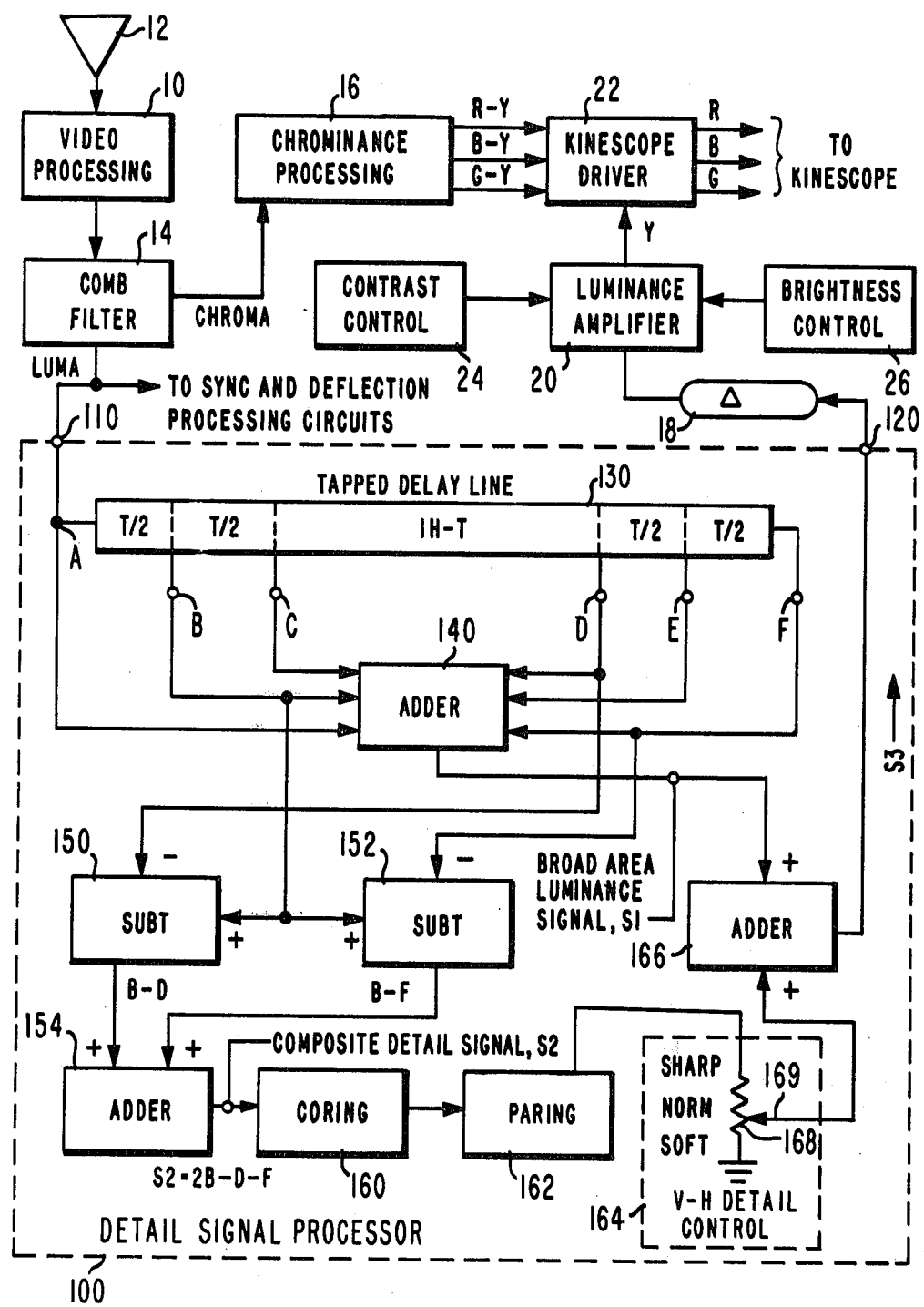
FIG. 1 is a block diagram of a television receiver including a detail signal processor embodying the invention.

In FIG. 1 the detail signal processor 100 embodying the invention is interposed in the luminance signal processing path of a television receiver for controlling the "detail" or "sharpness" in all directions (vertical, diagonal, horizontal) of reproduced images. As will be explained subsequently, the detail content of the processed luminance signal may be attenuated or unaltered or enhanced by adjustment of a single control means in the processor. Overly sharp images may thus be softened, overly soft images may be sharpened and where the image edge detail is acceptable, the control means may be adjusted to provide essentially no detail alteration. The detail or image definition may be controlled in continuous or discrete steps from one extreme of the range (detail attenuation or softening) to the other (detail enhancement or sharpening) and does not alter the ratio of the vertical and horizontal detail signal components or the diagonal component. It will be appreciated that the detail signal processor 100 is of general utility and may be used in video equipment other than television receivers such as TV cameras, tape recorders, video disc players, frame or field synchronizers, special effects equipment, etc.

The receiver comprises a video signal processing unit 10 responsive to radio frequency (RF) television signals received by an antenna 12 for generating (by means of suitable tuner circuits, intermediate frequency circuits and detection circuits, not shown) a composite video signal comprising chrominance and luminance signal components. The output of video signal processing unit 10 is coupled to a comb filter 14 which separates the luminance and chrominance signals from the composite video signal. The chrominance output signal of filter 14 is applied to a chrominance signal processing unit 16 which includes circuitry for deriving the R-Y, B-Y, and G-Y color difference signals from the chrominance signal.

The luminance output signal of filter 14 is applied to sync and deflection processing circuits (not shown) and to the input terminal 110 of detail signal processor 100 which modifies the vertical and horizontal detail signal components (i.e., the edge definition) of the luminance signal and performs other functions, as will be explained to provide a processed luminance output signal. The output terminal 120 of processor 100 is coupled via a delay element 18 to the input of a luminance amplifier unit 20. The purpose of delay element 18 is to equalize or compensate for delay differences between the chrominance and luminance signal processing channels of the receiver thereby maintaining proper registration of reproduced images. Delay differences exist principally because of signal filtering and bandwidth differences between the two channels with the chrominance channel having the narrower bandwidth and greater delay (e.g., ½ MHz and 1 μsec) as compared with that of the luminance channel (e.g., 3-4 MHz or so). The delay element 18 may be a conventional delay line, CCD shift register or some other suitable delay means and may precede rather than follow processor 100 in the luminance signal processing path.

Luminance amplifier 20 serves to amplify and otherwise process the luminance signal to produce an output signal Y. The Y output signal and the R-Y, G-Y, and B-Y color difference output signals of chrominance processor 16 are coupled to a kinescope driver 22 where they are matrixed to form R, G, and B color signals for driving a kinescope (not shown). Alternatively, the luminance and color difference signals may be matrixed in the kinescope as is known.

A contrast control unit 24 is coupled to luminance amplifier 20 to control the amplitude of the luminance signal and thereby control the contrast of reproduced images. Contrast control unit 24 may also be coupled to chrominance processing unit 16 to control the amplitude of the chrominance signals and thereby control the color saturation level of reproduced images. A brightness control unit 26 is also coupled to luminance amplifier 20 to control the D.C. content of the luminance signals and thereby control the brightness of the reproduced images.

Figures 4, 5:
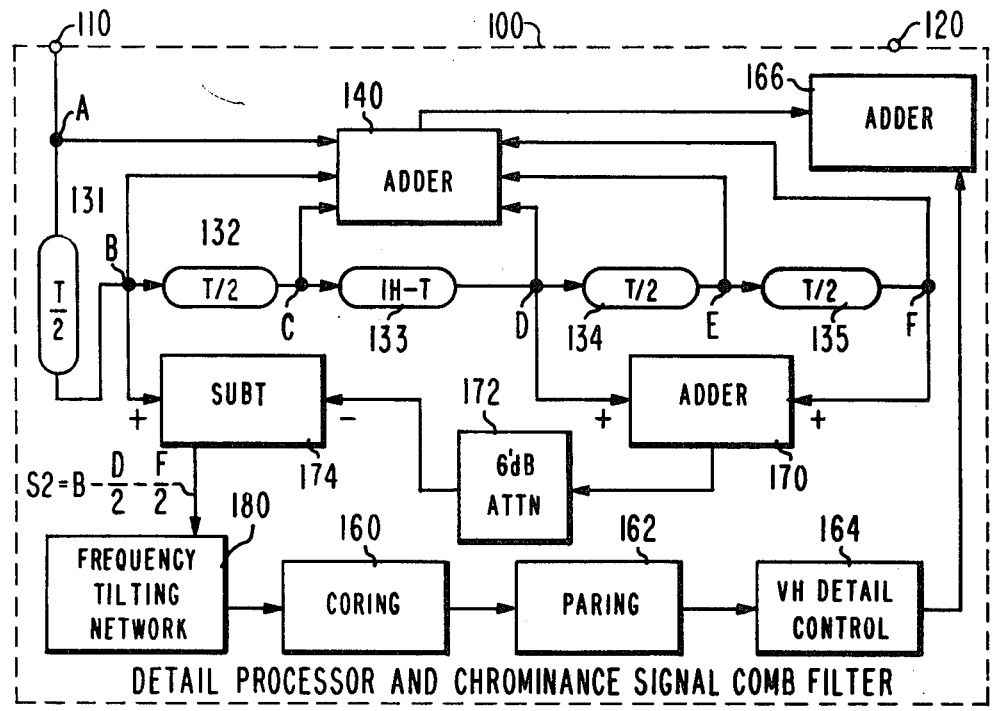
FIGS. 4 and 5 are block diagrams illustrating modifications of the receiver and the detail signal processor of FIG. 1.

Detail signal processor 100 comprises a tapped delay line 130 having an input tap A coupled to input terminal 110, four intermediate taps B, C, D, and E and an output tap F. The time delays between adjacent taps AB, BC, DE, and EF are all T/2 wherein T is the period of the color subcarrier frequency. The time delay between the adjacent intermediate taps CD is equal to 1H−T, wherein H equals the period of the horizontal line scanning frequency. Tapped delay line 130 may comprise a distributed parameter LC delay line, a CCD or bucket brigade delay line, a cascade connection of discrete delays means (as shown in FIG. 4), a binary shift register (where the signals are of digital rather than analog form) or some other suitable means of providing luminance signal delay. The total length or delay time provided by line 130 is 1H+T which, it will be noted, is greater than 1H but substantially less than that of the prior art peaking circuits previously referred to which employed two 1H delay lines.

Taps A-F are applied to the input terminals of an adder 140 which combines (sums) the signals to thereby form (in combination with line 130) a comb filter that produces what will hereinafter be referred to as a "broad area luminance" signal, S1, at the output of adder 140. The term "broad area luminance signal" as used herein is defined to be a luminance signal in which vertical and horizontal detail components thereof are attenuated. For the illustrative values of the tap delays, such a signal will be produced at the output of adder 140 by weighing or scaling the signals at taps A-F in the ratio 1:2:1:1:2:1. If delay line 130 is substantially lossless, adder 140 may be implemented by a simple resistive summing network in which the conductances of the summing resistors are in the aforementioned ratio. If line 130 exhibits some loss or attenuation, then the resistors in adder 140 may be appropriately scaled to compensate for the loss. If line 130 is a CCD or bucket brigade delay line, then adder 140 may be implemented with the delay line by means of conventional channel path splitting and recombining techniques as is known.

FIG. 3A illustrates the transfer function or passband characteristic of the comb filter formed by line 130 and adder 140 for the illustrative delays and tap weighting values. For ease of illustration, only a few of the comb filter response peaks are shown. Peaks occur at d.c. and at integer multiples of fh, the horizontal line scanning frequency. For illustrative purposes, the vertical scale (amplitude) of FIG. 3A is shown as extending from zero to two units and the horizontal scale (frequency) extends from 0 Hz to fsc wherein fsc is the color subcarrier frequency (about 3.58 MHz in the NTSC system). As is seen, the response of the broad area luminance signal comb filter exhibits a low pass characteristic, that is, "teeth" of the comb are periodic and exhibit a maxima at 0 MHz (d.c.), decrease in amplitude about 6 dB at fsc/2 and are highly attenuated at the color subcarrier frequency, fsc. A composite video signal, processed by such a filter, would also be devoid of chrominance signal spectrum components since they occur at odd multiples of half the line frequency which correspond to the comb filter passband null points. Thus, terminal 110 may be connected directly to the output of video processing 10 if desired.

In order to provide a complete range of control of the definition of reproduced images (i.e., from soft to sharp), the broad area luminance signal, S1, is supplemented by a composite detail signal, S2 (which includes a vertical detail component and a horizontal detail component), to form a processed luminance output signal S3. The ratio of the vertical and horizontal detail components is predetermined by a further comb filter which generates the supplementary or composite detail signal S2 and the ratio or proportionment of the broad area luminance and the composite detail signal S2 is controlled by varying the amplitude of the signal S2. The signal ratios (vertical vs horizontal detail and broad area luminance vs supplementary or composite detail) are thus independent or non-interactive and so one may readily control the detail or edge definition of reproduced images by means of a single control device (e.g., a potentiometer, variable gain amplifier or the like) in the S2 signal path without alteration of relationship of the vertical and horizontal peaking (detail enhancing) components.

The composite detail signal, S2, is produced by a second comb filter comprising delay line 130, two subtractors 150 and 152, and an adder 154. Subtractor 150 has inputs coupled to taps B and D of line 130 and produces an output difference signal B-D wherein the components B and D of the difference signal are equally weighted. Subtractor 152 has inputs coupled to taps B and F of line 130 and produces an output difference signal B-F, the components B and F of the difference signal also being equally weighted. The two difference signals are combined in adder 154 to provide the composite detail signal, S2, which equals 2B-D-F. As is known, subtraction of analog signals may be facilitated by inverting the subtrahend signal (D or F) and adding the inverted subtrahend signal (−D or −F) to the minuend signal (B). Where the luminance signal is digitized and line 130 is implemented as an N bit wide binary shift register, the generation of the signal S2 may be provided by conventional binary arithmetic units. The shift register length and clock frequency should be selected to provide the aforementioned delays between taps A-F. The clock frequency should equal or preferably exceed the Nyquist rate for sampled data systems to minimize aliasing problems and the word length (N) should be selected to provide an adequate signal to noise ratio for the video signals (in frame stores, for example, N is typically 8 bits).

Operation of the comb filter formed by elements 130-154 is illustrated by the waveform of FIGS. 2A-2D. Subtractor 152 in combination with delay line 130 forms a comb filter having an amplitude response as shown in FIG. 2A. For ease of illustration, the amplitude response is normalized to a scale of 0-1 and only a few of the 228 "teeth" or response peaks of the filter are shown. The frequency spacing between the teeth is equal to the reciprocal of H+(T/2) where H is the period of one horizontal scan line and T is the period of the color subcarrier frequency.

Subtractor 150, in combination with delay line 130 also forms a comb filter, the amplitude vs frequency response characteristic of which is shown in FIG. 2B. As compared with FIG. 2A, there are fewer teeth (227 rather than 228) in the comb due to the slightly shorter delay between the subtracted signals B and D. The frequency spacing between the comb teeth in this case is equal to the reciprocal of H−(T/2) which is greater than that of the comb filter formed by elements 130 and 152.

FIG. 2C illustrates the frequency spacing difference between peaks of the comb filter response waveforms of FIGS. 2A and 2B. The frequency spacing difference is zero Hz at d.c. (0 Hz), rises linearly to about 7850 Hz at one half the subcarrier frequency, fsc/2, and decreases linearly to zero Hz at the subcarrier frequency. Each of the comb filters represented by waveforms 2A and 2B exhibits a response null at 0 Hz and fsc. However, due to the different frequency spacing and thus differing numbers of maxima or teeth, the null at fsc/2 of FIG. 2A coincides with a peak of FIG. 2B. Thus, when the signals B-D and B-F are combined in adder 154 a comb filter is formed having a non-uniform amplitude response as shown in FIG. 2D. Specifically, the amplitude response is unit as fsc/2 and approaches 2 units at 0 Hz and fsc. The region below fsc/2 represents the vertical detail passband characteristics of the comb filter and the region above fsc/2 represents the horizontal detail passband characteristic. The reduction in the amplitude response of the filter in the region around fsc/2 to unity provides attenuation of diagonal detail components of the composite detail signal S2 which otherwise would tend to be exaggerated if, for example, S2 was generated by simply adding the output of a vertical detail filter to that of a horizontal detail filter.

It will also be noticed from FIG. 2D that the horizontal and vertical passband characteristics of the composite detail comb filter (130, 140-154) are symmetrical. This symmetry results from the choice of taps (B, D, and F) and weighting coefficients (+2, −1, −1) for the comb filter. For this symmetrical case the ratio of the vertical and horizontal components of the composite detail signal S2 will by unity. An effect of this is that when the composite detail signal S2 is added to the broad area luminance signal S1 the edge detail in the vertical and horizontal directions of the reproduced image will appear equally sharpened (peaked) or softened in all directions. In the subsequent discussion of FIGS. 4 and 5, examples are given of how the vertical-horizontal detail ratio may be modified.

The composite detail signal S2 is applied via a cascade connection of a coring circuit 160, a paring circuit 162 and a V-H (vertical-horizontal) detail control circuit 164, in the order named, to one input of an adder 166 which receives the broad area luminance signal, S1, at its other input and supplies the resultant processed luminance output signal S3 to output terminal 120 of processor 100.

Control 164 comprises a potentiometer 168 coupled between the output of paring circuit 162 and a source of reference potential (ground) and having a wiper contact 169 connected to the S2 input of adder 166. When potentiometer 168 is set to its minimum output position (i.e., wiper 169 at ground level) the signal S2 is fully attenuated and so the signal S3 will equal the broad area luminance signal S1 in which the vertical and horizontal detail components thereof are attenuated as previously explained. This setting of potentiometer 168 thus results in softening of the displayed image of the receiver. At the central setting of wiper 169, the amount of detail signal S2 added to the broad area luminance signal S1 is substantially equal to the amount of vertical and horizontal detail components removed from S1 so that the resultant luminance signal S3 produced at terminal 120 is neither peaked nor softened. This is referred to as the "normal" setting of control 164.

As the wiper is positioned closer to the output of paring circuit 162, the magnitude of the detail signal added to S1 exceeds that removed from S1 and the excess detail signal results in a sharpening or enhancement of the edge detail of reproduced images. This corresponds to the "sharp" setting of control 164. This effect is illustrated in FIGS. 3A-3C where FIG. 3A corresponds to the response characteristic of the broad area luminance signal comb filter, FIG. 3B corresponds to the response characteristic of the composite V-H detail comb filter (FIG. 2D redrawn for clarity) and FIG. 3C represents the combined effects of the two comb filters at the output of adder 166. As is seen, the peaks of FIG. 3A correspond to the nulls of FIG. 3B for the frequencies below fsc/2 and, for the assumed setting of control 164, the resultant luminance channel response exhibits vertical detail peaking below fsc/2 and horizontal detail peaking above fsc/2. At fsc/2, the envelope of the peaks in the luminance channel response exhibits a minimum since fsc/2 corresponds to the minimum point of the composite detail filter characteristic (i.e., unity gain). It will be appreciated that FIGS. 3A-3C are simplified to clarify the drawings owing to the difficulty of illustrating the hundreds of teeth of the comb filters. Dashed lines are used to indicate the envelope of the response characteristics. In FIG. 3C at lower frequency the teeth are so closely spaced as to overlap slightly, the overlap decreasing with increasing frequency. This effect on the response characteristic is indicated by the dashed line from 2 on the vertical axis to fsc on the horizontal axis.

The coring of the signal S2 provided by coring circuit 160 improves the picture quality by removing low amplitude noise components from the composite detail signal. In applications where the luminance signal exhibits an acceptable signal-to-noise ratio, circuit 160 may be omitted. The paring circuit 162 (e.g., a limiter) removes high amplitude noise pulses from the composite detail signal and it too may be omitted in cases where impulse or spike noise is not a problem. If coring or paring circuits are used in processor 100 it is desirable that they precede rather than follow the V-H detail control 164 in the cascade connection to prevent changes in the setting of control 164 from altering the coring and/or paring levels.

In FIG. 4, a frequency tilting network has been added to processor 100 to vary the ratio of the vertical and horizontal components of the composite detail signal. Also, delay line 130 has been replaced by individual delay line sections and the composite detail signal S2 is generated by addition of the signals at taps D and F and subtraction of the resultant signal from that at tap B.

In more detail, delay line 130 has been replaced by individual delay line sections 131-135 which provide the same values of time delay at taps A-F as delay line 130. This modification does not affect the operation of processor 100 but serves to illustrate that the delay required by the processor may be provided by discrete, as well as continuous, delay means.

Subtractors 150 and 152 and adder 154, which form part of the composite detail signal comb filter in the example of FIG. 1 have been replaced by an adder 170, a 6 dB attenuator 172 and a subtractor 174. Adder 170 has inputs connected to taps D and F and produces an output sum signal, D+F, which is reduced by a factor of ½ (i.e., 6 dB) by attenuator 172. The attenuated sum signal is then subtracted from the signal at tap B by means of subtractor 174 to provide a resultant composite detail output signal S2 equal to B-D/2-F/2. The ratio of the coefficients of the S2 components (B, D, F) is thus the same as in the example of FIG. 1 (i.e., +2, −1, −1 or 1, −0.5, −0.5) so that the comb filter formed by elements 131-135 and 170-174 exhibits the same response characteristics as that formed by elements 130 and 150-154 in FIG. 1.

In both examples of the invention discussed thus far, the composite detail signal comb filter produces a composite detail signal S2 having equal vertical and horizontal peaking components (see FIG. 2D). In some cases, it may be desirable to alter this ratio (1:1 or unity) of the vertical and horizontal components to provide more detail enhancement in one direction than the other. This feature of the invention is provided for in FIG. 4 by a frequency tilting network 180 interposed in the cascade connection of elements (160, 162 and 164) which couples the composite detail signal produced by subtractor 174 to the input of adder 166. Specifically, network 180 is connected between the output of subtractor 174 and the input of coring circuit 160. Illustratively, to provide greater vertical than horizontal peaking, network 180 may be implemented as a lag-lead network. Conversely, where more detail is desired in the horizontal direction rather than the vertical direction, network 180 may be a lead-lag network. Since the phase shift of such networks is not linear (particularly in the transition region of the network transfer function) one may, alternatively, employ a more complex network having the desired frequency tilting characteristic but better phase response (e.g., Gaussian networks or other filters having a substantially linear phase vs frequency characteristic).

FIG. 5 illustrates an alternative modification of processor 100 of FIG. 1 for altering the ratio of the vertical and horizontal components of the composite detail signal S2. Specifically, subtractor 150 and 152 and adder 154 have been replaced by a signal combiner 200 having six inputs connected to respective ones of the taps A-F and an output coupled to supply the composite detail signal S2 to coring circuit 160. For the illustrative values of the tap weighting coefficients shown (−1, +6, −1, −3, +2, and −3) for the signals at taps A-F, the transfer function of the composite detail signal comb filter will exhibit a maximum near fsc which is about twice the magnitude of the maximum near 0 Hz. Luminance detail signals processed through such a comb filter (i.e., the combination of line 130 and combiner 200) will thus have greater horizontal than vertical detail components. Reversing the tap weighting function will reverse this ratio causing the vertical detail components of the composite detail signal to be emphasized with respect to the horizontal detail component.

In FIGS. 4 and 5 where the ratio of the horizontal and vertical detail signals is altered (i.e., different from unity), it is preferable that the ratio of attenuation of the vertical and horizontal detail components of the broad area luminance signal S1 also be changed in a complementary sense such that for an intermediate setting of control 164, the resultant processed liminance signal produced by adder 166 exhibits an overall uniform frequency response characteristic. As a result, changing the control setting in either sense will alter the ratio of vertical and horizontal detail signal components in proportion to the change in the setting. The ratio of the attenuation factors of S1 may be controlled by appropriate selection of the weighting coefficients of adder 140.

What is claimed is:

1. A video signal processor for processing a video signal having a luminance component comprising:

Signal delay means having an input tap for receiving a video input signal, a plurality of intermediate taps and an output tap;

first signal combining means coupled to each of said input, intermediate and output taps to form a first comb filter means having an output for providing a filtered luminance signal in which vertical and horizontal detail components thereof are attenuated;

second signal combining means coupled to selected ones of said taps excluding said output of said first means for forming a second comb filter means for providing a composite detail signal having a vertical detail component and a horizontal detail component in a predetermined ratio; and third signal combining means for combining said filtered luminance signal with said composite detail signal to provide a resultant video output signal, said third signal combining means including control means for varying the ratio of said filtered luminance signal and said composite detail signal whereby the vertical and horizontal detail content of said video output signal may be attenuated for one setting of said control means and enhanced for another setting of said control means.

2. A video signal processor as recited in claim 1 wherein said delay means is of a kind providing a delay between said input and output taps of more than one line and less than two lines of said video signal.

3. A video signal processor as recited in claim 1 wherein said first signal combining means comprises means for combining video signals present at said input, four of said intermediate and said output taps in the proportion 1:2:1:1:2:1.

4. A video signal processor as recited in claim 1 further comprising:
a signal path for coupling said composite detail signal produced by said second signal combining means to an input of said third signal combining means; and
coring means interposed in said signal path.

5. A video signal processor as recited in claim 1 further comprising:
a signal path for coupling said composite detail signal produced by said second signal combining means to an input of said third signal combining means; and
paring means interposed in said signal path.

6. A video signal processor as recited in claim 1 further comprising:
a signal path for coupling said composite detail signal produced by said second signal combining means to an input of said third signal combining means;
coring means interposed in said signal path; and
paring means interposed in cascade connection with said coring means in said signal path.

7. A video signal processor as recited in claim 1 wherein said video input signal comprises a composite video input signal inclusive of a luminance component and a chrominance component and further comprising:
filter means for receiving said composite video input signal and for separating said luminance component from said chrominance component; and
means for supplying the separated luminance component as said video input signal to said input tap of said signal delay means.

8. A video signal processor as recited in claim 1 further comprising:
a signal path for coupling said composite detail signal produced by said second signal combining means to an input of said third signal combining means; and
frequency tilting network means interposed in said signal path for controlling said ratio of said vertical detail component and said horizontal detail component of said composite detail signal in said predetermined ratio.

9. A video signal processor as recited in claim 1 wherein said second signal combining means is of a type having at least three inputs coupled to respective selected ones of said taps, an output for providing said composite detail signal and includes signal addition and subtraction means coupled such that said composite detail signal includes a signal component from one of said taps double the magnitude and of opposite sign to either signal component produced at the others of said taps such that said predetermined ratio of said vertical and horizontal detail components is substantially unity.

10. A video signal processor as recited in claim 1 wherein said second signal combining means is of a type having at least six inputs coupled to respective selected ones of said taps and wherein respective weighting coefficients for the six inputs are selected such that said predetermined ratio of said vertical and horizontal detail components of said composite detail signal differs from unity.

* * * * *